(12) United States Patent
Yuan

(10) Patent No.: US 6,496,704 B2
(45) Date of Patent: Dec. 17, 2002

(54) SYSTEMS AND METHODS FOR INTERNETWORKING DATA NETWORKS HAVING MOBILITY MANAGEMENT FUNCTIONS

(75) Inventor: Ruixi Yuan, Waltham, MA (US)

(73) Assignee: Verizon Laboratories Inc., Waltham, MA (US)

(*) Notice: Subject to any disclaimer, the term of this patent is extended or adjusted under 35 U.S.C. 154(b) by 108 days.

(21) Appl. No.: 08/820,869

(22) Filed: Mar. 20, 1997

(65) Prior Publication Data

US 2001/0041571 A1 Nov. 15, 2001

Related U.S. Application Data

(60) Provisional application No. 60/034,192, filed on Jan. 7, 1997.

(51) Int. Cl.[7] .................................................. H94Q 7/00
(52) U.S. Cl. ........................ 455/466; 455/426; 455/432; 455/435; 455/445; 370/338; 370/349
(58) Field of Search .................................. 455/432, 433, 455/435, 436, 437, 438, 439, 442, 466, 560, 426, 445; 370/331, 338, 349, 351, 352, 392

(56) References Cited

U.S. PATENT DOCUMENTS

| 5,535,431 A | * | 7/1996 | Grube et al. ................ 455/411 |
| 5,590,133 A | * | 12/1996 | Billstrom et al. ........... 370/349 |
| H1641 H | * | 4/1997 | Sharman ..................... 370/352 |
| 5,711,008 A | * | 1/1998 | Gallant et al. .............. 455/466 |
| 5,771,275 A | * | 6/1998 | Brunner et al. ............. 455/466 |
| 5,825,759 A | * | 10/1998 | Liu .............................. 455/433 |
| 5,845,211 A | * | 12/1998 | Roach, Jr. .................... 455/466 |
| 5,901,352 A | * | 5/1999 | St. Pierre et al. ........... 455/433 |

* cited by examiner

Primary Examiner—Lester G. Kincaid
(74) Attorney, Agent, or Firm—Leonard Charles Suchyta; James K. Weixel

(57) ABSTRACT

The invention provides systems and methods for allowing internetwork data transfers to mobile data devices. In particular, the invention includes systems for internetworking a CDPD network system with an Internet protocol network, and more particularly with a Mobile Internet Protocol Network. In one aspect, the invention can be understood as systems that allow mobile computing systems to negotiate the exchange of data across two disparate networks by providing within at least one of the networks a system that redirects the destination of data packets in order that the redirected data packets get forwarded to the changing locations of the Mobile Computing system. In another aspect, the invention can be understood as systems that allow a Mobile computing system to negotiate the exchange of data across disparate networks by providing a redirecting element within one of the networks that will redirect data packets destined for that mobile computing system to the transient location of the computing element.

21 Claims, 13 Drawing Sheets

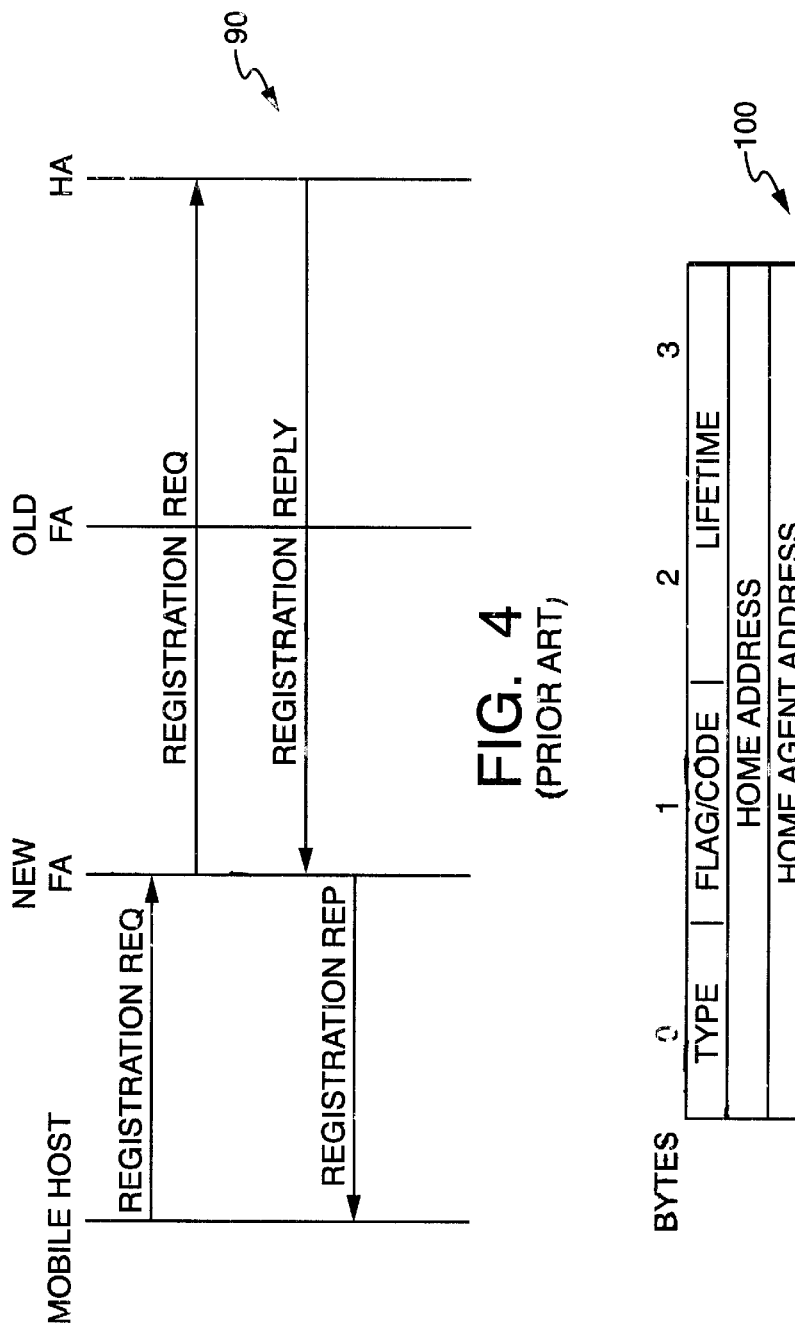

SYSTEMS AND METHODS FOR INTERNETWORKING DATA NETWORKS HAVING MOBILITY MANAGEMENT FUNCTIONS

This application is based on U.S. provisional patent application No. 60/034,192, filed on Jan. 7, 1997.

TECHNICAL FIELD

The application relates to the field of electronic communications and more particularly to the field of computer networks that provide services to mobile data devices.

BACKGROUND OF THE INVENTION

The advances of wireless communication and microelectronic technologies have enabled the tremendous growth of wireless communication services. For example, in just a few years, cellular telephone networks have appeared all over the country, and cellular phones have become a common consumer item. Currently, the majority of wireless communication services are geared towards voice applications and/or paging. However, due to the increasing popularity of portable computers, telecommunications engineers are now developing wireless data communication networks that transmit packets of digital data. These systems will allow a mobile computer system to remain connected to a data network, while the computer system travels to different locations.

To this end, the cellular digital packet data (CDPD) protocol recently has been developed to address the issue of network layer mobility support for data networks. The CDPD protocol was developed by the CDPD Forum, an industry association consisting of cellular carriers and equipment vendors, to provide packet data services through the cellular telephony network. One attribute of CDPD is that it allows a network device to change its location within the network. This improves upon static network systems that employ network connectivity and routing that fails to support mobile network devices.

CDPD is designed to exploit unused capacity of the cellular telephone network for packetized data delivery. It employs the existing cellular infrastructure along with additional CDPD specific equipment.

Referring to FIG. 1, a CDPD network 20 has a first network area 22 that includes at least one mobile end system (MES) 24. The MES 24 may be implemented as a mobile terminal with a wireless modem that accesses the CDPD network 20 through an airlink. The MES 24 may have one or more network entity identifiers (NEI) which can be either Internet protocol or connectionless network protocol addresses. The wireless modem used in connection with the MES 24 may also have a 48 bit CDPD equipment identifier assigned by the manufacturer.

The network area 22 also includes at least one mobile database station (MDBS) 26 that provides mobile data link relay functions for the MES 24 over the radio channel. In the CDPD protocol, the MDBS 26 performs part of the radio resource management function to insure that the user data does not interfere with the regular voice users of the cellular network. In the CDPD protocol, there may be up to two hundred MDBS's in the network area 22.

The network area 22 also includes a mobile data intermediate system (MDIS) 28 which controls mobility and performs registration, authentication, and routing functions. The MDIS 28 is a network gateway and also controls the MDBS 26 in connection with radio resource management.

Another CDPD network area 32 also contains at least one MES 34, at least one MDBS 36 and another MDIS 38. The MES 34, the MDBS 36, and the MDIS 38 of the network area 32 are all analogous to corresponding components of the network area 22. As described in more detail below, the CDPD network 20 allows the MES 24 from the first area 22 to migrate to and operate in the second area 32 and, similarly, allows the MES 34 from the second area 32 to migrate to and operate in the first area 22.

The MDIS 28 from the first area 22 and the MDIS 38 from the second area 32 function as gateways into a conventional Internet protocol and/or connectionless protocol network backbone 42. The backbone 42 is connected to one or more intermediate systems 44 which are connected to one or more fixed end systems 46 in a conventional manner. Accordingly, the MES 24 from the first network area 22 may communicate with the MES 34 in the second network area 32 and/or the fixed end system 46. Similarly, the MES 34 from the second network area 32 may communicate with the MES 24 from the first network area 22 and/or the fixed end system 46. Each of the network areas 22, 32 may be treated as a single network segment (e.g. Ethernet) with each of the respective MDIS elements 28, 38 serving as the network gateway. Note that, by convention, all CDPD network areas use 166 as the network prefix. For example, FIG. 1 shows the first network area 22 having an address of 166.200.x.x and the second network area 32 having network addresses 166.100.x.x.

The CDPD protocol allows the MES 24 to migrate out of the area 22 and into the area 32 while still maintaining a data connection to the network. Such a migration is illustrated by a dotted line 48. Once the MES 24 has entered the second area 32, the MES 24 recognizes the new area during cell transfer by listening to a channel identification message broadcast from the MDBS 36 of the second area 32 during channel acquisition. Upon detecting the new area 32, the MES 24 initiates a registration process using the conventional Mobile Network Registration Protocol (MNRP) via the new MDIS 38. The new MDIS 38 handles the registration for the MES 24 and communicates with the home MDIS 28 (i.e., the original MDIS of the MES 24) so that appropriate authentication can be performed, and appropriate routing can be set up at the home MDIS 28 to forward packets designated for the MES 24 in an appropriate manner, as described in more detail hereinafter.

When the MES 24 migrates from the first area 22 to the second area 32, an authentication process is used to verify the identity of the MES 24. In the CDPD network protocol, airlink security is accomplished by exchanging secret keys between the serving (i.e., new) MDIS 38 and the visiting MES 24 using a Diffe/Hellman key exchange scheme. After the MES 24 obtains a key from the MDIS 38, the MES 24 sends authentication information to the serving MDIS 38. This authentication information includes an authentication random number, an authentication sequence number, and the network entity identifier of the MES 24. The serving MDIS 38 then relays this authentication information to the home MDIS 28 for confirmation.

After confirming the visiting MES 24, the home MDIS 28 provides to the serving MDIS 38 a success indicator. The home MDIS 28 also assigns a new authentication random number and authentication sequence number and provides that information to the serving MDIS 38, which then relays that information to the visiting MES 24. The new authentication random number and authentication sequence number can be used for authentication in connection with a subsequent registration of the MES 24. Once this information has been transferred from the home MDIS 28 to the serving MDIS 38, the registration at the home MDIS 28 (or at another previous serving MDIS) is canceled.

FIG. 2 is a data flow diagram 50 illustrating an exchange of messages that occurs under the CDPD when an MES moves from a network being served by an old serving MDIS to a network being served by a new serving MDIS. The home MDIS is shown as a separate device because, generally, the home MDIS is not required to be either the old serving MDIS or the new serving MDIS. Note that in the example discussed in connection with FIG. 1, the home MDIS is illustrated as being the old serving MDIS.

The diagram 50 shows that the MES first exits from the network being served by the old serving MDIS. Following that, the MES enters the new network served by the new serving MDIS and establishes a datalink therewith. The MES then provides the new serving MDIS with an end system hello, which includes the authentication information discussed above. Upon receipt of the end system hello, the new serving MDIS forwards the authentication information to the home MDIS for confirmation by the home MDIS. The home MDIS then confirms the authentication information and provides confirmation to the new serving MDIS which can then provide intermediate system confirmation to the MES. The intermediate system confirmation includes the new authentication random number and authentication sequence number to be used by the MES at the next registration, as discussed above. The home MDIS also provides a redirect flush message to the old serving MDIS. The redirect flush cancels the registration of the MES at the old serving MDIS.

Following the registration process, data packets destined for the MES are forwarded from the home MDIS to the new serving MDIS. Prior to forwarding, the home MDIS encapsulates the packets into a new connectionless protocol packet where the destination of the new connectionless protocol packet is the serving MDIS's address. When the serving MDIS receives the encapsulated packet, the serving MDIS decapsulates the packet and delivers the packet to the MES using the established data link channel. Note that the MES keeps the same Internet protocol address at all times.

The above description of the CDPD network illustrates the protocol employed for allowing a wireless data device to maintain a network connection while migrating through different areas of a cellular network. Another network protocol that supports mobile data devices is Mobile IP. The Mobile IP is the result of the efforts of the Internet Engineering Task Force (IETF) to support mobile data devices that are relocatable within an IP network, such that the mobile data device can be connected to different subnetworks of the IP network.

Referring to FIG. 3, the Mobile IP may be illustrated with reference to a conventional Internet protocol network that interconnects a home network 62, a foreign network 64, and one or more other networks 66. The home network 62 includes a host 68, a home agent (HA) 70, a router 72, and a mobile host (MH) 74. The host 68, the HA 70, and the router 72 remain fixed with the home network 62. The MH 74, on the other hand, may move to other networks as indicated by an arrow 76 illustrating movement of the MH 74 from the home network 62 to the foreign network 64.

The foreign network 64 includes a plurality of hosts 78, 80 and a foreign agent (FA) 82 which is shown in FIG. 3 as being the router/gateway that interfaces the foreign network 64 to the Internet 60. The Mobile IP is designed to support mobility of any conventional host within an Internet protocol network. Therefore, although FIG. 3 only shows the one mobile host 74, the hosts 68, 78, 80 could also be mobile hosts.

A local network segment, such as the home network 62 or the foreign network 64, may have more than one router/gateway attached thereto for communicating with the Internet 60. To address this, the Mobile IP uses the home agent 70 and the foreign agent 82 to route packets to/from the mobile host 74. The foreign agent 82 is located in the foreign network 64 and provides direct network access to the mobile host 74 when needed. The home agent 70 is responsible for intercepting the IP packets destined for the mobile host 74 and for forwarding the IP packets to the foreign agent 82 of the mobile host 74.

The foreign agent 82 and the home agent 70 advertise their presence with agent advertising messages that use extensions of the router advertisement Internet Control Message Protocol (ICMP). For example, as shown in FIG. 3, when the mobile host 74 transitions from the home network 62 to the foreign network 64, as indicated by an arrow 76, the mobile host recognizes the new network (i.e. the foreign network 64) from the agent advertisement message broadcast periodically by the foreign agent 82. The network layer broadcast of the agent advertisement message is necessary because there may not be a data link layer mechanism to detect the network segment change. The agent advertisement message includes one or more Care-of-Address (COA) signals from the foreign agent 82, an indication of the encapsulation types supported by the foreign agent 82, an indication of the registration lifetime, and an advertisement sequence number. Once the mobile host detects the network change from the agent advertisement message, the mobile host 74 then initiates the registration process with the home agent 70 using conventional UDP messages with a destination port of 434. The registration message is relayed through the serving foreign agent 82 in the foreign network 64. The registration process enables the home agent 70 to update the mobility binding of the home agent 70 (e.g., mobile host, COA, last message ID, registration lifetime) for the migrating mobile host 74 so that packets can be forward to the new location of the mobile host 74.

To address authentication and security concerns, the Mobile IP host optionally includes flexible authentication extensions that can be added to the registration message using keyed MD5. An authenticator between the mobile host 74 and the home agent 70 and an authenticator between the mobile host 74 and the foreign agent 82 may be attached to the registration message for proper authentication. In addition, while different authentication schemes may be employed by the mobile host 74, the home agent 70, and the foreign agent 82, through service agreements in advance, the Mobile IP working group has specified a default authentication message using the conventional MD5 algorithm (RFC1321). The MD5 algorithm computes a one-way hash function that produces a one hundred twenty eight bit long "fingerprint" for an arbitrary long message. A mechanism for distribution of the authentication key is not specified by Mobile IP. However, the shared secret key may be pre-configured for the mobile host 74 to home agent 70 authentication. For the mobile host 74 to foreign agent 82 authentication, the key can be distributed manually. Alternatively, a public key may be employed.

Referring to FIG. 4, a data flow diagram 90 illustrates the general case of a mobile host moving from a first network containing an old foreign agent to a new network containing a new foreign agent. The diagram 90 shows that the mobile host provides a registration request to the new foreign agent which then provides a registration request back to the home agent. The home agent provides a registration reply back to the new foreign agent which then provides a registration reply back to the mobile host. Note that the old foreign agent is not part of the registration process and in fact is not explicitly informed that the mobile host has moved out of the network serviced by the old foreign agent.

Referring to FIG. 5, a data structure diagram 100 illustrates a packet format for Mobile IP registration messages. Most of the fields are self-explanatory. The Care-Of-Address field refers to the address of the foreign agent that is receiving packets on behalf of the mobile host.

Note that the Mobile IP also defines an option for the mobile host to act as its own foreign agent if the foreign network has no foreign agent and if the mobile host can obtain a local address from the Dynamic Host Configuration Protocol (DHCP) server. In this case, the care-of-address is the newly obtained local IP address from the DHCP server.

Packet forwarding in the Mobile IP is carried out using encapsulation/decapsulation. The home agent intercepts packets destined for the mobile host and then encapsulates the packet using the COA provided in connection with registration of the mobile host. Upon receiving the encapsulated packet, the foreign agent decapsulates the packet and sends it directly to the mobile host using the link layer protocol of the mobile host. Note that although as discussed above there is no registration cancellation procedure when a mobile host moves out of a network serviced by the old foreign agent, the home agent knows the address of the new foreign agent and therefore forwards the packets appropriately. The registration with the old foreign agent will simply expire after a certain amount of time.

Currently, a CDPD network will not support a mobile IP data device, nor will a mobile IP network support a CDPD device. Consequently, if a Mobile IP Host migrates into a CDPD coverage area (and vice versa), the network connection will be terminated even if the Mobile IP Host uses a CDPD wireless modem. This occurs because the network layer protocol for mobility support of the two networks are not interoperable with each other. A similar failure will occur when a CDPD station attempts to join a mobile IP network. It would be desirable to enable universal network activities for both networks and to provide methods for the two networks to internetwork with each other.

SUMMARY OF THE INVENTION

The invention provides systems and methods for allowing internetwork data transfers for a mobile data device. For example, the invention provides systems that internetwork a CDPD network with a Mobile Internet Protocol network to allow a mobile data device to transfer data through the CDPD network and the Mobile Internet Protocol network.

Accordingly, in one aspect, the invention can be understood as systems and methods that allow mobile data devices to negotiate the exchange of data across two or more disparate networks. To this end, the systems and methods provide a first one of the networks with a mobile service element that redirects the destination of data packets to a mobile service element of a second network. The mobile service element of the second network tracks the migrating location of the mobile data device and forwards the redirected data packets to the changing locations of the mobile data device. Accordingly, the mobile service elements cooperate to route data from the first network to the second network and then to the mobile data device. In another aspect, the invention can be understood as mobile service elements that are capable of routing the data packets to a mobile service element of a network. In another aspect, the invention can be understood as mobile data devices capable of directing a mobile service element of a first network to route data to a mobile service element of a second network.

A mobile data device, as the term is employed herein, may be understood to encompass any movable system capable of generating or processing data, and may include any movable data processing system, such as a lap-top computer, a hand-held computing system, a computer system adapted for being carried on-board a vehicle such as a truck, or a taxi, or any other data device capable of moving from a first location to a second location.

A network, as the term is employed herein, may be understood to encompass any system capable of carrying signals representative of information between a first data processing system and a second data processing system and can include LANs, WANs, internets, intranets, cellular broadcasting systems and systems that exchange information, in part or in whole, as radio-frequency signals, optical signals, electrical signals, or by any other medium suitable for carrying data.

A mobility service controller, as the term is employed herein, may be understood to encompass any system capable of tracking a network connection to a mobile data device and for routing data to the mobile data device, and can include a Mobile IP home agent, a CDPD MDIS or any other suitable system. A mobility service controller can be a data processing system operating a computer program that directs the data processing system to track the network connection of a mobile data device.

More particularly, the invention can be understood as methods for allowing a Mobile IP host to exchange data across a CDPD network. It is one realization that both CPDP and Mobile IP provide mobility management functions, implemented by mobility service controllers, that allow mobile data devices to migrate to different locations within a computer network. One method according to the invention can employ these mobility management functions to allow the internetworking of a CDPD network with a Mobile IP network. These methods can comprise the steps of interfacing a CDPD mobile end station (MES) with a Mobile IP host to allow an exchange of data. In a further step, the CDPD MES can connect to the CDPD network, and can direct the Mobile IP host to pass an IP compliant message to the CDPD MES for transmission across the CDPD network to register the IP host with a home agent, and to provide the home agent with an address that is associated with CDPD MES. In a further step, the methods provide the home agent with a program for encapsulating, as a function of the address associated with the CDPD MES, ingoing messages which are representative of messages being sent to the Mobile IP host. In this way, the methods of the invention forward ingoing messages across the CDPD network and to the Mobile IP host.

In one practice of the invention, the methods include the further step of directing the Mobile IP host to query the CDPD MES device to collect a CDPD address signal that is a representative of a CDPD address for the MES device. In this practice of the invention, the step of providing the home agent with an address can include the step of providing the CDPD address signal as a COA signal. Further, this practice of the invention can include the step of directing the Mobile IP host to provide an AT command signal for reading a memory device having the CDPD address signal. For example, the CDPD device can be a cellular modem device having an NEI address signal stored within a persistent memory device. The Mobile IP host can be a data processing system that can generate a string of AT commands that directs the cellular modem to provide the data processing system with the NEI signal.

In a further embodiment, the methods of the invention can include the additional step of providing a bi-directional encapsulation tunnel between the Mobile IP host and the home agent. In this practice of the invention, the step of providing a bi-directional encapsulation tunnel can include the step of providing a forward encapsulation program for encapsulating, as a function of the address, an outgoing message that is representative of a message being sent from a Mobile IP host. In a further step, the system can encapsulate the outgoing message as a function of the address signal associated with the home agent, and can provide the home agent with a decapsulation program for decoding the encapsulated outgoing message to identify a host destination for receiving the outgoing message.

In a further embodiment, the methods of the invention can include the step of registering the CDPD MES, interfaced with the mobile IP host, according to the Mobile network registration protocol. Additionally, the methods of the invention can include a step of interfacing the CDPD MES with a Mobile IP host that includes a step of coupling the Mobile IP host with a CDPD compliant cellular modem, with a CDPD compliant docking station, or with any CDPD device capable of interfacing to a CDPD network.

In a further practice, the methods can include the step of directing a Mobile IP host to employ a CDPD MDIS as a router for outgoing messages.

In another embodiment, the invention can be understood as methods for allowing a CDPD MES to exchange data across the Internet. This method can comprise the steps of providing the CDPD MES with an Internet program for forming a Mobile connection to the Internet, and providing a foreign agent with a program for monitoring a registration request from the CDPD MES and, in response thereto, generating a redirect request signal that is a representative of an instruction for directing an MDIS associated with the CDPD MES to forward a data packet to the foreign agent. In this practice of the invention, the step of providing a program for monitoring a registration request signal can include the step of providing a program for detecting a network address representative of a CDPD network entity. In particular, this can include the step of providing a program that monitors a request to detect a network address having a prefix of 166.

In a further practice, the methods can include the step of providing a program for directing the foreign agent to employ a Mobile network registration protocol for generating the redirect request. In a further practice, the invention can include the step of directing the Internet program to generate an Internet compliant data packet for transmitting data from the CDPD MES across the Internet. In yet a further practice, the invention can include the step of providing the MDIS with an encapsulation program for encapsulating the data packet as a function of the redirect request, and for forwarding the encapsulated data to the foreign agent. In this practice of the invention, the methods can include the step of providing the foreign agent with a decapsulation program for processing the encapsulated data packet to generate a signal representative of the data packet.

In a further practice, the methods can include the step of providing an Internet program that includes an authorization program for generating an authentication signal as a function of a CDPD authentication parameter.

In a further practice, the methods can include the step of providing a home agent program for encapsulating the data packet for transfer to the foreign agent. This practice can include the further step of incorporating the home agent program in the MDIS.

In a further aspect, the methods can be understood as apparatus for allowing a Mobile IP host to exchange data across a CDPD network. The apparatus according to the invention can comprise a CDPD MES that is interfaced with a Mobile IP host, a communications program for connecting the CDPD MES to the CDPD network, a data processing system for generating an IP compliant message having an address representative of the CDPD network to register the Mobile IP host with a home agent and a program for encapsulating, as a function of the address, ingoing messages representative of messages being sent to the Mobile IP host.

In a further embodiment, the invention can be understood as apparatus for allowing a CDPD MES to exchange data across the Internet. Such apparatus can include a program for forming a mobile connection to the Internet, and a foreign agent having a program for monitoring a registration request from the CDPD MES and, in response thereto, for generating a redirect request signal that is representative of an instruction for directing an MDIS associated with a CDPD MES to forward the data packet to the foreign agent.

These and other embodiments of the invention will be more clearly understood by reference to the following detailed description and attached drawings in which like reference numbers refer to like elements.

BRIEF DESCRIPTION OF DRAWINGS

FIG. 4 depicts a conventional datagram of data that is exchanged during a registration operation performed by a Mobile IP host for migrating across subnetworks such as the subnetworks depicted in FIG. 3;

FIG. 5 depicts a conventional datagram representation of the data that is exchanged during a registration process such as the registration process depicted in FIG. 4;

DETAILED DESCRIPTION OF THE ILLUSTRATED EMBODIMENTS

The systems will now be described by reference to certain exemplary embodiments, and in particular by reference to systems for internetworking CDPD networks with mobile IP networks. However it will be apparent to one of ordinary skill in the art that the systems described herein can be practiced with other data network systems that provide, or can be adapted to provide, mobility management functions.

Figure 1:
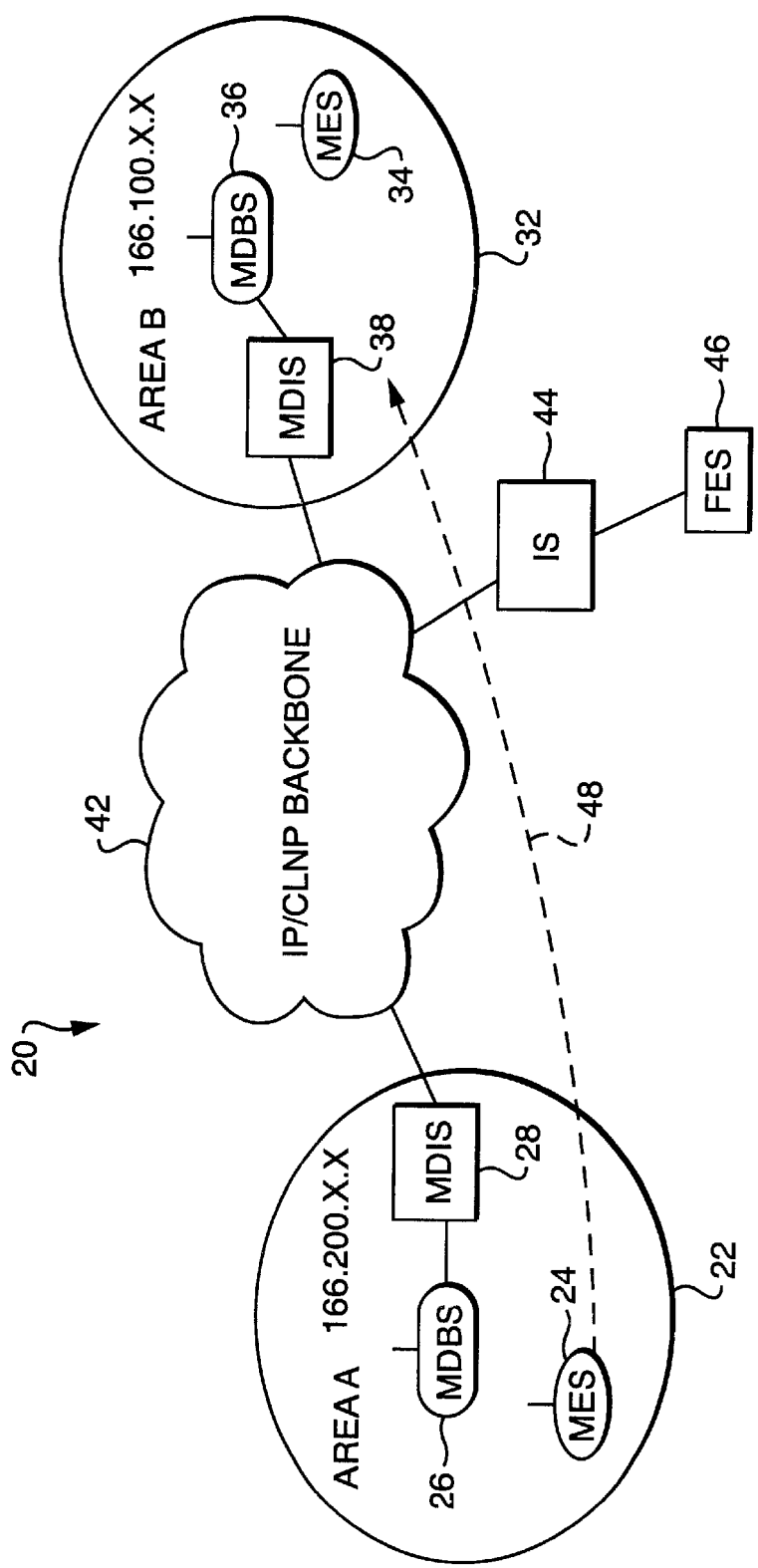
FIG. 1 depicts a conventional CDPD network that allows a Mobile End Station to migrate across different areas within a CDPD network.
Figure 2:
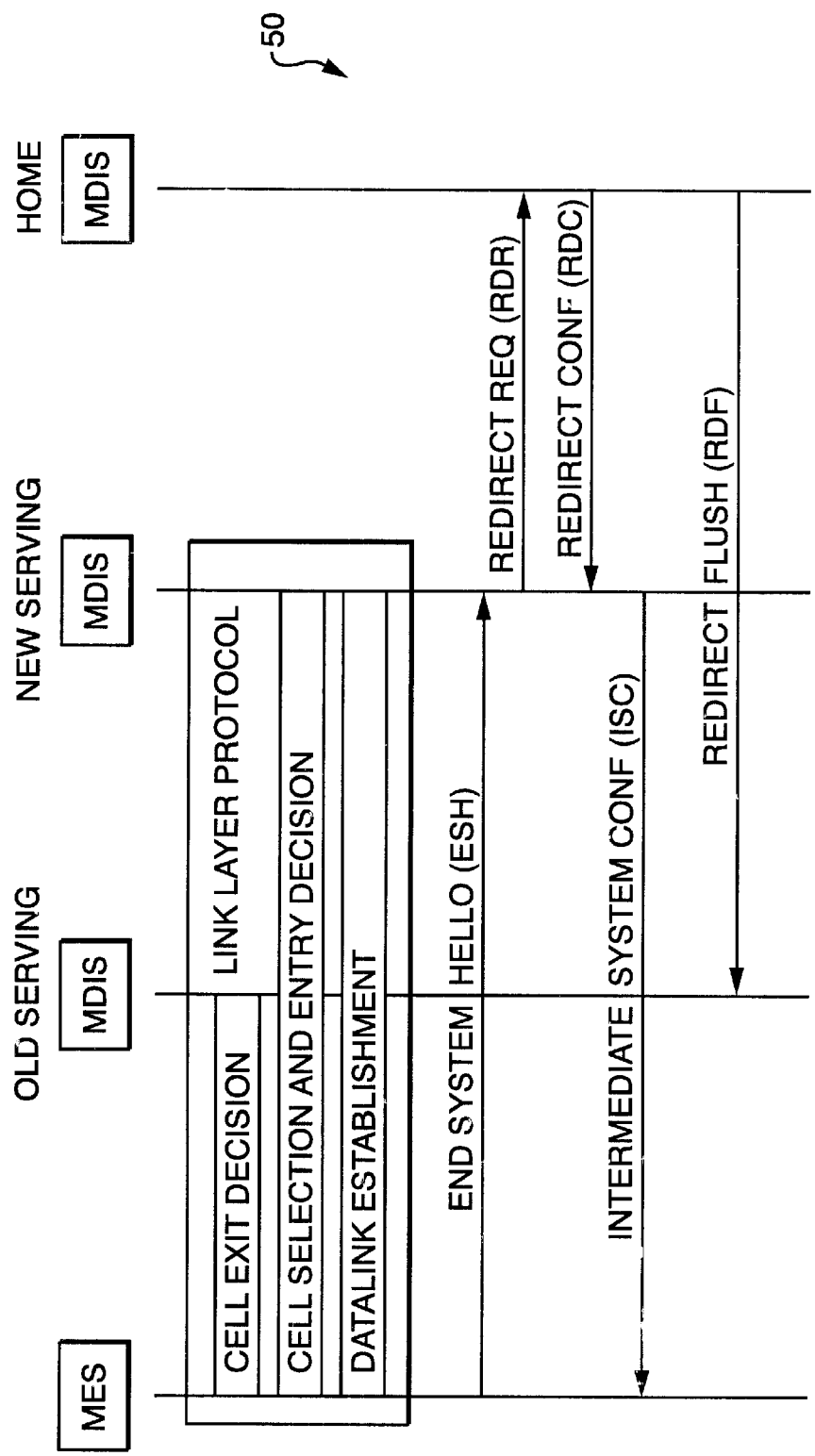
FIG. 2 depicts a conventional datagram that is representative of the data exchanges that occur when a Mobile End Station migrates from a first area of a CDPD network to a second area of a CDPD network such as the CDPD network depicted in FIG. 1.
Figure 3:
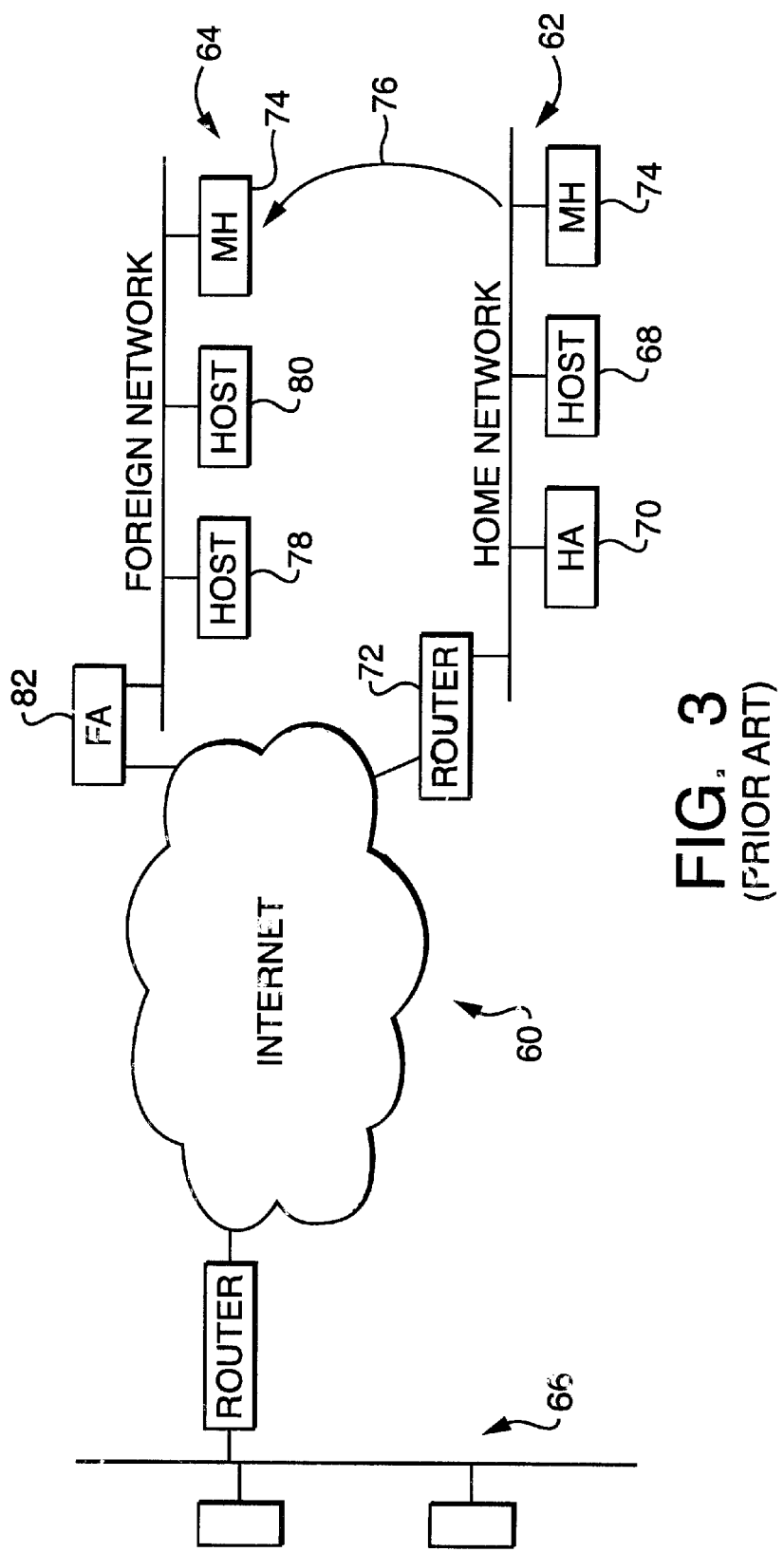
FIG. 3 depicts a conventional Mobile IP Network that allows a Mobile Internet host to migrate between subnetworks in an IP network.
Figure 6:
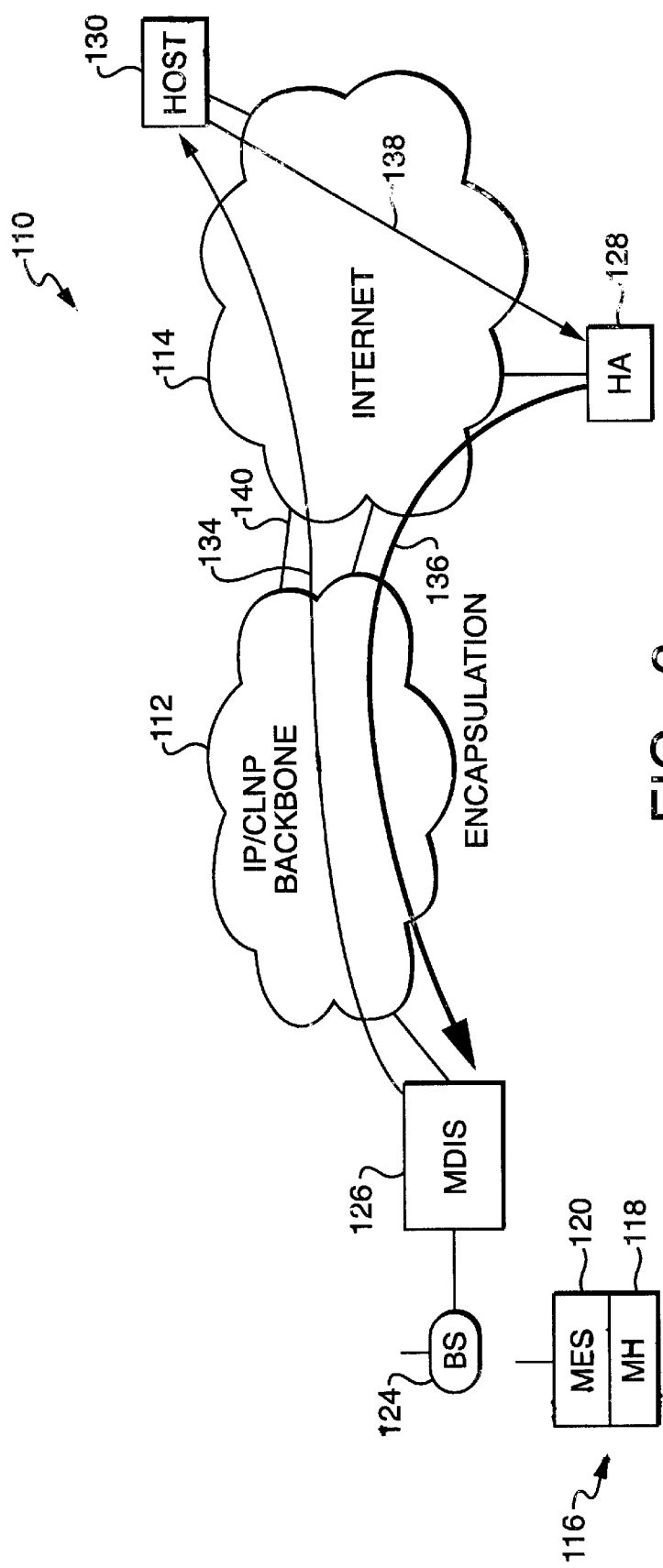
FIG. 6 depicts one system for allowing a Mobile IP data device to transmit data across a CDPD network and to an IP host.

FIG. 6 illustrates a first embodiment that allows mobile data devices to migrate between and communicate across different types of networks. In the embodiment of FIG. 6, a system 110 internetworks a cellular data network to an Ethernet type data network. The depicted cellular data network is a CDPD network and the depicted Ethernet data network is a Mobile IP network. In particular, FIG. 6 shows that the system 110 includes an IP/CLNP network backbone 112 that couples to a plurality of MDIS systems to form the CDPD network, an IP compliant network 114, a mobile data device unit 116 that includes a Mobile IP Host 118 and a CDPD compliant Mobile End Station (MES) 120, a Mobile Data Base Station(MDBS) 124, a Mobile Data Intermediate System (MDIS) 126, a home agent 128, an IP Host 130, and a plurality of transmission paths 134, 136, 138, 140.

The system 110 depicted in FIG. 6 allows the mobile unit 116 to communicate data through both the CDPD network 112 and the Internet 114. In part, FIG. 6 depicts this internetwork communication ability by showing that the mobile unit 116 can exchange data with the IP Host 130 by passing data across the CDPD Network 112 and the Internet 114.

To this end, the internetworking system 110 includes a CDPD network that connects a data transmission path to an Internet protocol network 114 that includes support for mobile data devices. Each of the depicted elements that are referenced in FIG. 6 can operate as previously described in connection with FIGS. 1–5 and will cooperate to allow a data exchange between the mobile unit 116 and the Remote IP Host 130.

FIG. 6 further depicts a mobile data device, shown as the mobile unit 116, that includes a Mobile IP Host 118 that interfaces to the Mobile End Station 120. Accordingly, the mobile unit 116 includes a mobile host Unit 118 that is adapted for transferring data across an IP compliant network, coupled with a Mobile End Station unit 120 that is adapted for transferring data across a CDPD network. In one example, the mobile unit 116 can be a lap-top computer system that includes a network communications package for forming a network connection to a Mobile IP network such as the network 114. The MES 120 can be a cellular modem device that is capable of forming a connection to the CDPD network 112.

In this example, the Mobile IP Host 118 can include a computer program for interfacing with the CDPD cellular modem 120. The computer program can direct the operation of the cellular modem 120, including directing the modem 120 to form a connection with the CDPD network 112. Additionally, the computer program can query the CDPD cellular modem 120 to collect from the modem 120 the network entity identifier (NEI) associated with the modem 120. For example, the computer program can generate a string of AT commands that can be sent to the CDPD modem device 120 to collect from a persistent memory device within the CDPD modem 120 the NEI of that CDPD device. In alternative embodiments, the Mobile unit 116 can be a single integrated device that includes a mobile IP compliant network device that is integrated with a CDPD network compliant device wherein the NEI is stored in a persistent memory device that is directly accessible to the Mobile IP Host unit. It will be apparent to one of ordinary skill in the art that other configurations of Mobile unit 116 can be practiced with the invention without departing from the scope thereof.

FIG. 6 further depicts a home agent 128 that connects to the IP network 114 and that is coupled via the transmission path 136 to the MDIS 126, and that couples via the transmission path 138 to the remote host 130. The home agent 128 can be a computer program operating as a process on an Internet host, and for example can be a C language computer program for operating on a IBM PC compatible computer system that includes a server process for connecting to the IP network 114. The depicted home agent 128 also includes a process for operating as a conventional home agent as described above.

The home agent 128 can further include an encapsulation program that encapsulates data packets for transfer to the MDIS 126. The encapsulation program can be a computer program, such as a C language computer program, that operates on the data processing system that supports the home agent process. The encapsulation program can receive data packets from the remote host 130 and encapsulate the programs within IP compliant data packets. The encapsulation program can generate these encapsulated IP compliant data packets to include, as the source destination, the NEI address associated with the CDPD device 120 of the Mobile unit 116. In one embodiment, the encapsulation program has an interface to the home agent process for receiving commands and data therefrom, including for receiving information representative of a care-of-address (COA) signal that represents an address to which data packets sent to the home agent are to be forwarded.

FIG. 6 graphically depicts the forwarding of data packets by the home agent 128 by showing the transmission path 136 that extends from the home agent 128 to the MDIS 126. The MDIS 126 acts as a gateway for the CDPD network device 120 of the mobile unit 116, and the MDIS transmits the encapsulated data packets to the CDPD modem device. In one embodiment, the CDPD network device is equipped with a decapsulation program that extracts the encapsulated information. The modem then provides that information to the Mobile host unit 118. Alternatively, encapsulated packets may be passed directly from the CDPD modem device to the Mobile host unit 118. In that case, the Mobile host unit 118 can include a decapsulation program that extracts the appropriate information from the encapsulated packets to collect the information transmitted from the remote IP host 130.

In operation, the Mobile unit 116 can migrate between different areas of the CDPD network 112 and still maintain access to Internet services available from the Internet 114. Accordingly, the Mobile unit 116 can migrate between different CDPD areas and will be able to establish network access through the CDPD network 112. To this end, the Mobile unit 116 can register with both the CDPD network 112 and the home agent 128 of the Internet 114. The Mobile unit 116 can follow the CDPD protocol to direct the CDPD modem device 120 to register with the serving MDIS 126. The registration operation can employ the Mobile Network Registration Protocol (MNRP) to provide the MDIS with the recognized IP address of the CDPD network device 120, which according to the CDPD protocol includes the prefix 166. Upon registration, the CDPD network understands the Mobile unit 116 to be a valid CDPD MES with a valid CDPD address. Accordingly, the Mobile unit 116 can then direct the Mobile IP host 118 to register with the Internet 114 through the home agent 128. In this step, the Mobile IP host 118 will provide the CDPD network address as the "care of address" for directing the home agent 128 to forward data packets to the MDIS 126 associated with the CDPD network device 120.

As depicted by FIG. 6, the registration of the CDPD device 120 and the Mobile IP host 118 with the respective network elements 112 and 114 allows the Mobile unit 116 to transmit IP compliant data packets across the interconnected networks 112 and 114 and to the remote host 130. In one typical sequence of operations, the Mobile IP host 118 passes data packet to the cellular modem 120 that transmits via airlink the data packets to the MDBS 124. The MDBS 124 provides the IP compliant data packets to the MDIS 126 which may then employ the connectionless Internet protocol for transferring the data packets across the CDPD network 112 and the Internet network 114 to the IP host 130.

As shown in FIG. 6, data packets transmitted from remote hosts to the Mobile IP host 118 follow the Mobile IP network protocol and are forwarded to the home agent 128 associated with that Mobile IP host unit 118. The depicted host agent 128 can include a resident computer program that encapsulates the IP data packets for forwarding the encapsulated data packet to the Mobile IP hosts employing the CDPD NEI as the COA.

Although FIG. 6 shows two networks, it will be apparent to one of ordinary skill in the art of communication systems that the systems and methods of the invention are scaleable and further networks can be interconnected in a similar manner.

Figure 7:
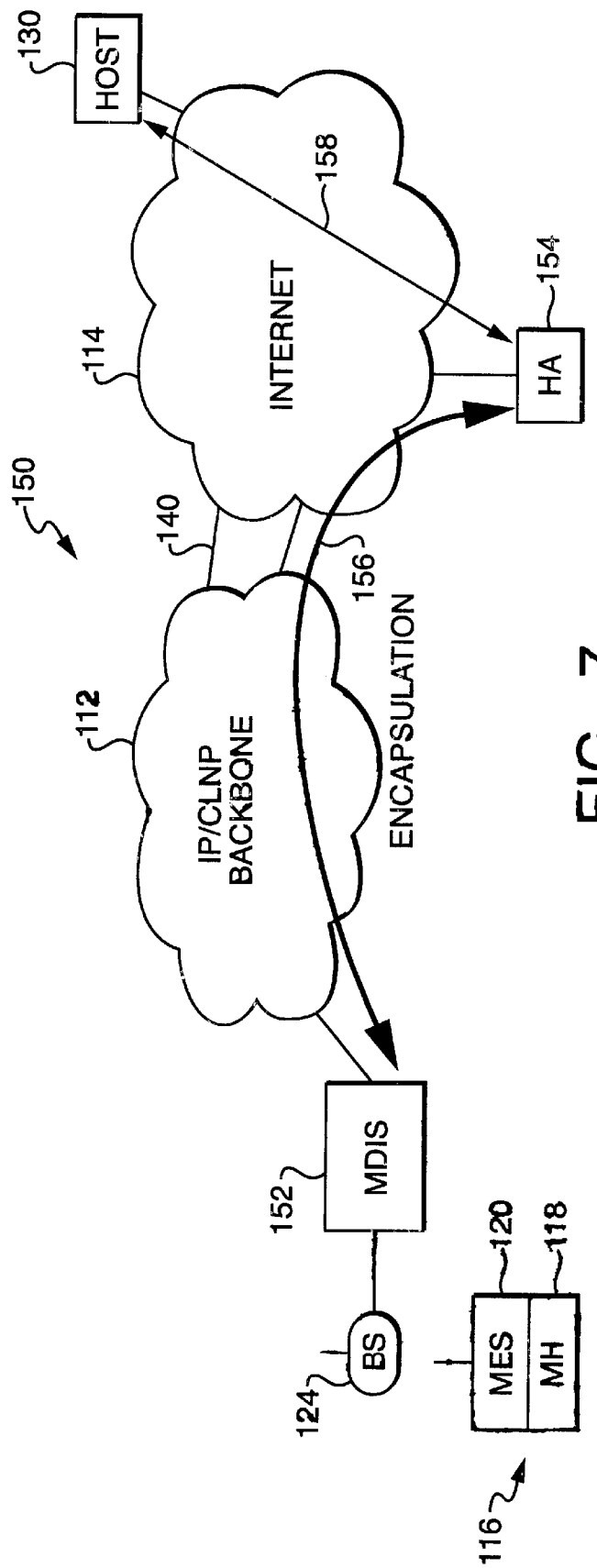
FIG. 7 depicts an alternative embodiment of a system for allowing a Mobile IP data device to transmit data across a CDPD network and to an IP host.
Figure 8:
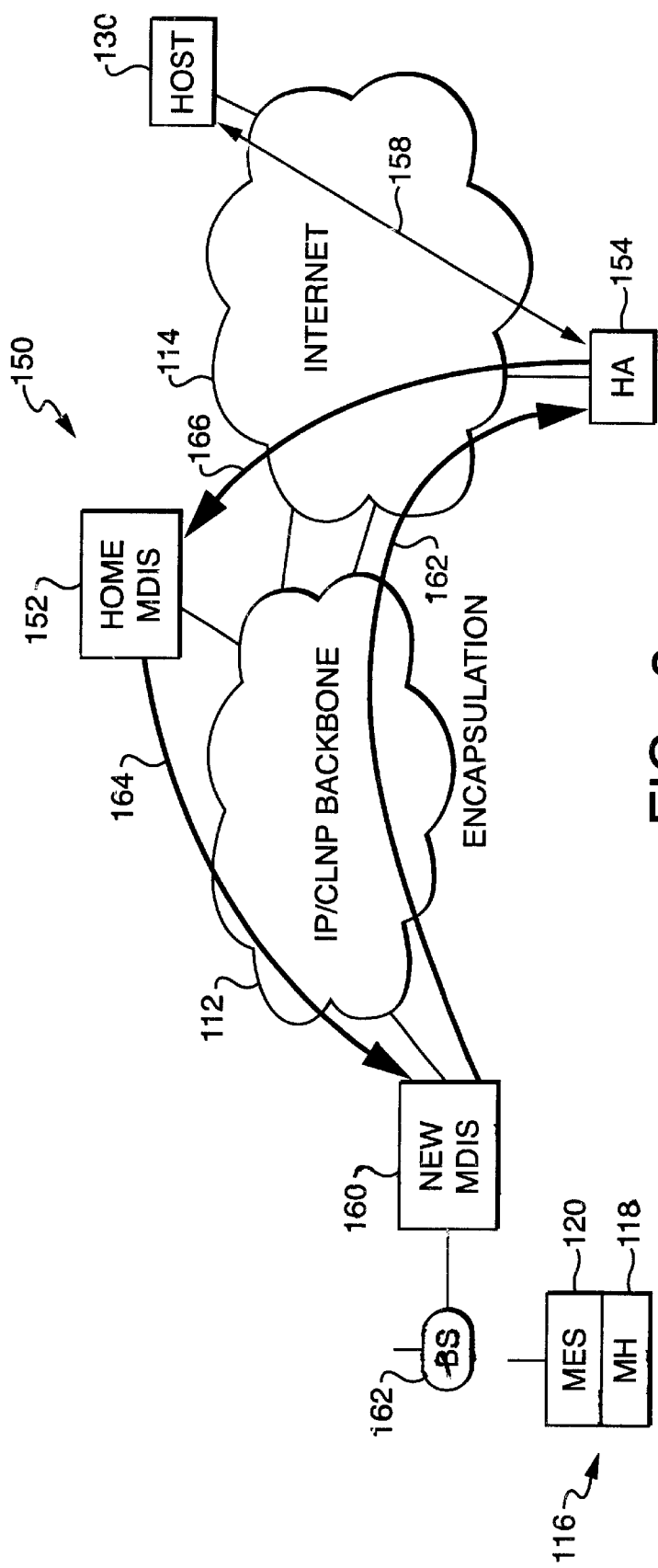
FIG. 8 depicts the migration of a Mobile IP data device from a first area of a CDPD network to a second area of a CDPD network.

FIGS. 7 and 8 depict a further alternative embodiment of the invention for allowing mobile data devices to migrate between and communicate across different types of networks. In particular, FIGS. 7 and 8 illustrate an alternative system 150 for expanding the mobility management functions of two or more disparate networks such that the network mobility binding mechanisms include internet-working functionality. In this exemplary embodiment, a Mobile IP host interconnects through a CDPD network to a remote IP host. To this end, FIG. 7 depicts an internetworking system 150 that includes a CDPD network 112, an Internet. protocol network 114, the mobile unit 116 having a mobile IP host 118 and an MES CDPD device 120, the MDBS 124, the MDIS 152, the HA 154, the remote IP host 130, a plurality of transmission paths 158, 140 and 156.

In this embodiment, the transmission path 156 acts as a bi-directional encapsulation that provides a connection between the MDIS 152 and the HA 154. In particular, the embodiment shown in FIG. 7 passes messages to and from the mobile unit 116 between the MDIS 152 and HA 154 such that the bi-directional encapsulation tunnel 156 serves as a virtual private network connection for the mobile unit 116 and the home network thereof. The mobile unit 116 includes an encapsulation program that encapsulates outgoing messages using the network address of HA 154 as the destination address, and using the CDPD NEI as the source address. The encapsulation program can be a computer program operating on a data processing system of the mobile unit 116, and, for example, can be a computer program operating on a lap-top computer that is configured as a mobile IP host, such as the mobile IP host 118. In this embodiment, the HA 154 can include a decapsulation program that decapsulates the data packets transmitted by the mobile unit 116 and forwards them to the intended destination, such as the remote IP host 130, depicted in FIG. 7. The decapsulation program of the HA 154 can be a computer program suitable for processing the encapsulated data packets to extract the encapsulated information therefrom and for transmitting the information in IP packets to the intended destination.

FIG. 8 graphically depicts migration of the mobile unit 116 from a first area of the CDPD network 112 to a second area of the CDPD network 112. The migration can include for example, migration of a mobile unit having a cellular CDPD compliant modem from a first cell of the cellular network to a second cell of the cellular network. In the system 150, the first area of the CDPD network 112 is serviced by the MDIS 152 and the second area of the CDPD network 112 is serviced by the MDIS 160. As described above, as the mobile unit migrates into the new area served by MDIS 160, the MES 120 recognizes the new area during cell transfer by listening to a channel identification message broadcast from the MDBS 160 of the new area. Upon detecting the new area, the MES 120 initiates a registration process, for example, by employing the conventional mobile network registration protocol, via the new MDIS 160. The new MDIS 160 can handle the registration for the MES 120 and can communicate with the home MDIS 152, i.e. the original or designated MDIS for the MES 120. Optionally, as described above, authentication can be performed. Upon registration, appropriate routing can be set up at the home MDIS 152 to forward packets designated for the MES 120. Accordingly, as depicted in FIG. 8, the migrating mobile unit 116 can still receive network access to the Internet network 114 via a bi-directional virtual network that couples the mobile unit 116 to the network 114 by directing packages through a HA in the mobile Internet network and through a home MDIS in the CDPD network.

Figure 9:
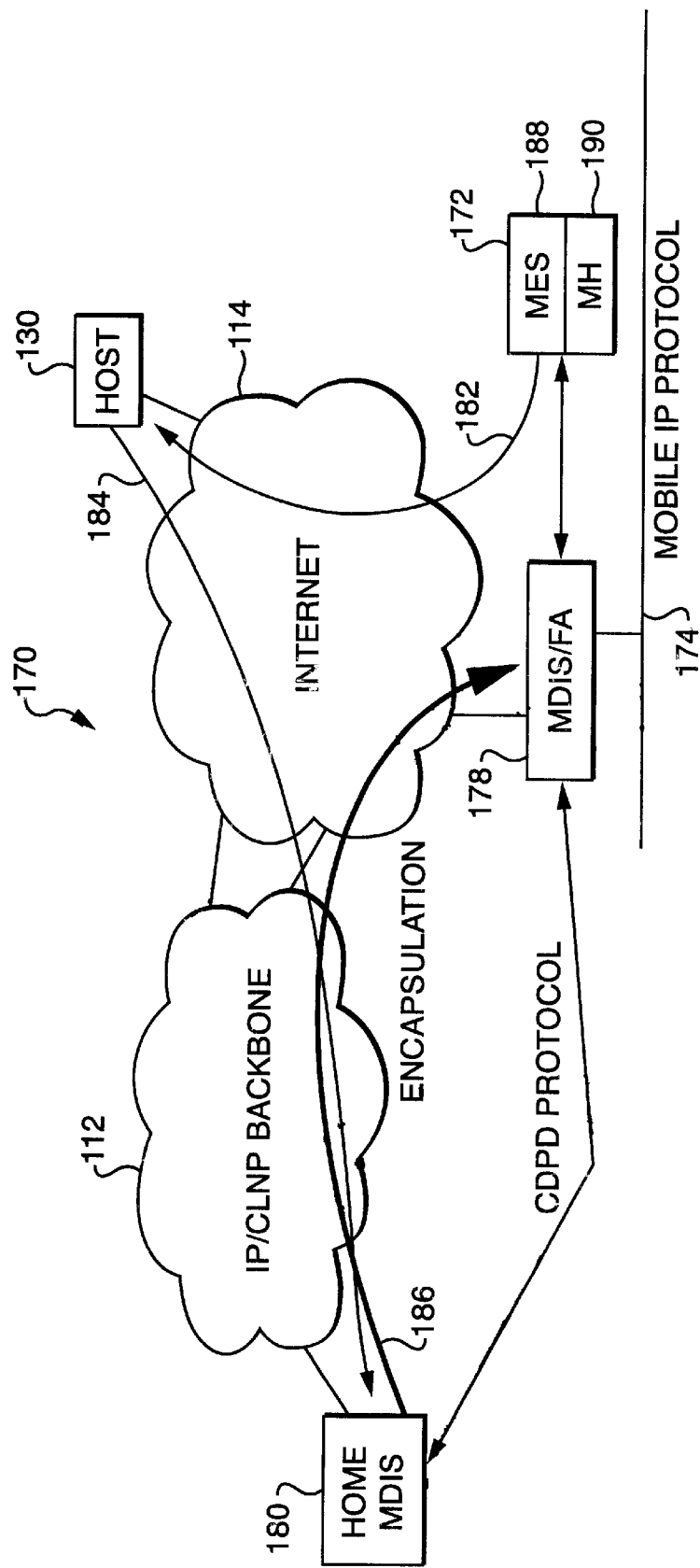
FIG. 9 depicts a registration process for a Mobile IP data device that migrates into a CDPD network.

FIG. 9 illustrates a process for allowing a Mobile IP host to migrate into a CDPD network. In a first step, the MES 188 of the mobile data device 172 broadcasts an "End System Hello" to notify the MDIS 178 that the MES has entered the area. The MDIS 178 registers with the home MDIS 180. The registration step includes a redirection request process that directs the home MDIS 180 to forward data packets to MDIS 178. The home MDIS 180 sends a redirect confirmation to the MDIS 178, to confirm that data for the MES 188 will be forwarded to the MDIS 178. Upon receiving confirmation of redirection, the MDIS 178 may broadcast an intermediate system confirmation signal to the MES 188 to notify the MES 188 that the redirection process is completed and the MDIS 178 may pass packets to the MES 188.

To register with the IP network 114, the MH 190 of the mobile data device 172 registers with the home agent 118. The home agent 128 replies to the MH 118 to confirm registration. As discussed above, the MH 118 employs a registration process that provides the home agent 128 with the NEI of the MES. Accordingly, the home agent 128 forwards data to the MES 120, which can pass the data to the MH 118.

Figure 10:
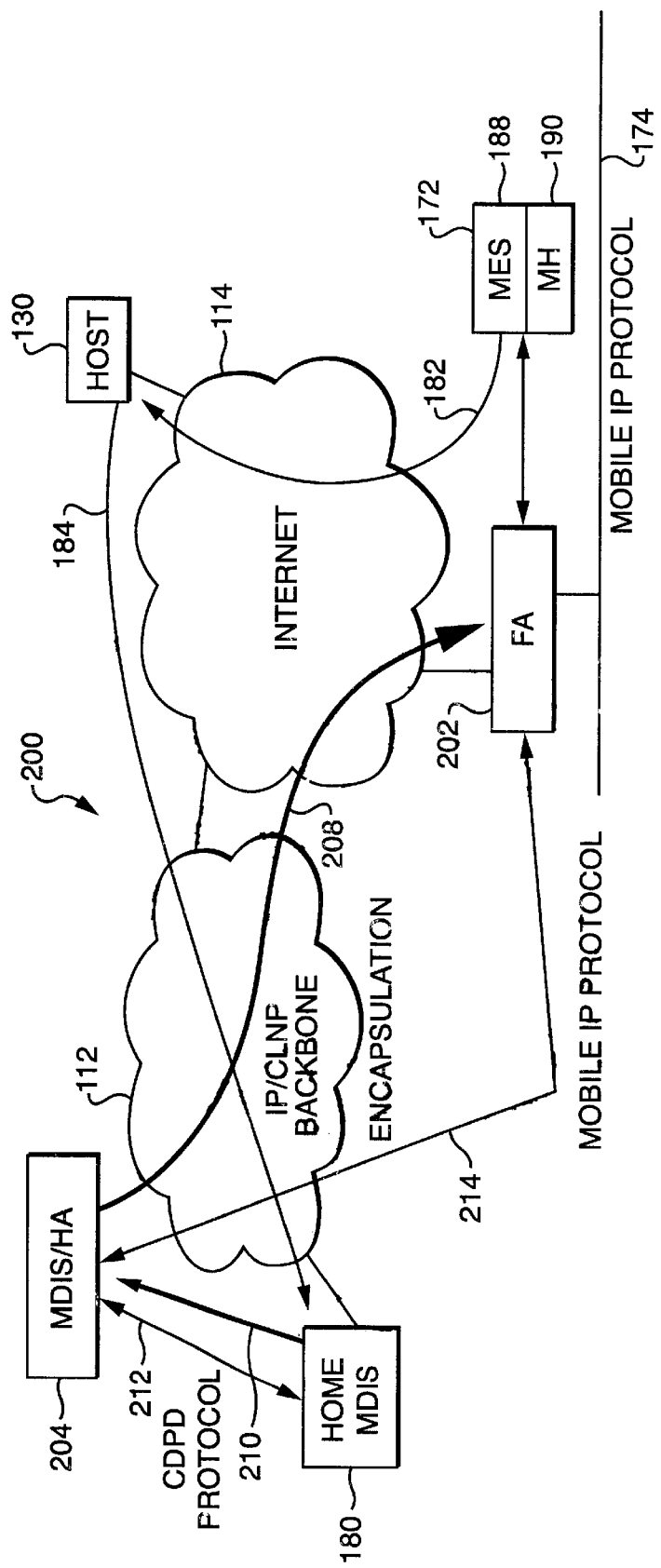
FIG. 10 depicts a process for performing internetwork data transfers for a Mobile IP data device operating within a CDPD network.

FIG. 10 illustrates a process for employing bi-directional encapsulation to perform inter-network data exchanges. As shown, the host 130 can send data through the home agent 204, through the home MDIS 180, and to the mobile data device 172.

In particular, the host 130 may employ IP protocol to send an IP packet to the mobile host 190. The home agent 204 will intercept the IP protocol packet and employ mobile IP encapsulation to send the packet on to the home MDIS 180. The home MDIS 180 forwards the packet to the MES 188 through the new MDIS 202 using CDPD protocol and a decapsulation process operated by the MDIS 202. The mobile host 190 employs a decapsulation program to obtain the original IP packet. The mobile host 190 can reply by employing an encapsulation program that encapsulates the data within a wrapper that includes the MES NEI address as the new source address and the home agent address as the new destination address. Accordingly, data packets travel to the home agent 204. The home agent 204 employs a decapsulation program to remove the IP header information and collect the original data packet. The data packet then travels to the host 130 with the original source address set as the mobile host 190 address, and the destination address given as the address of the host 130.

Figure 11:
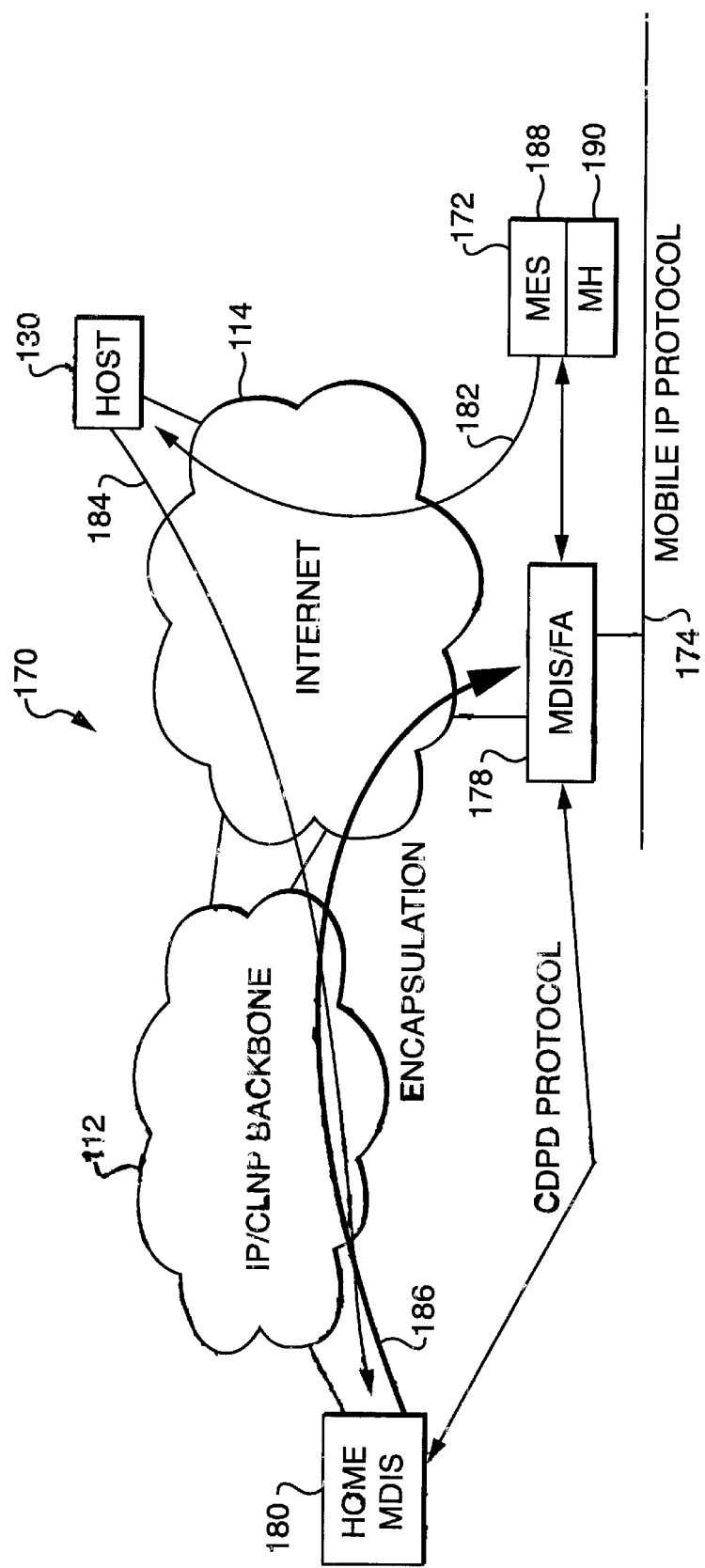
FIG. 11 depicts a further alternative embodiment that allows a CDPD device to couple into a subnetwork of a Mobile IP compliant network, and transfer data across a CDPD network.
Figure 12:
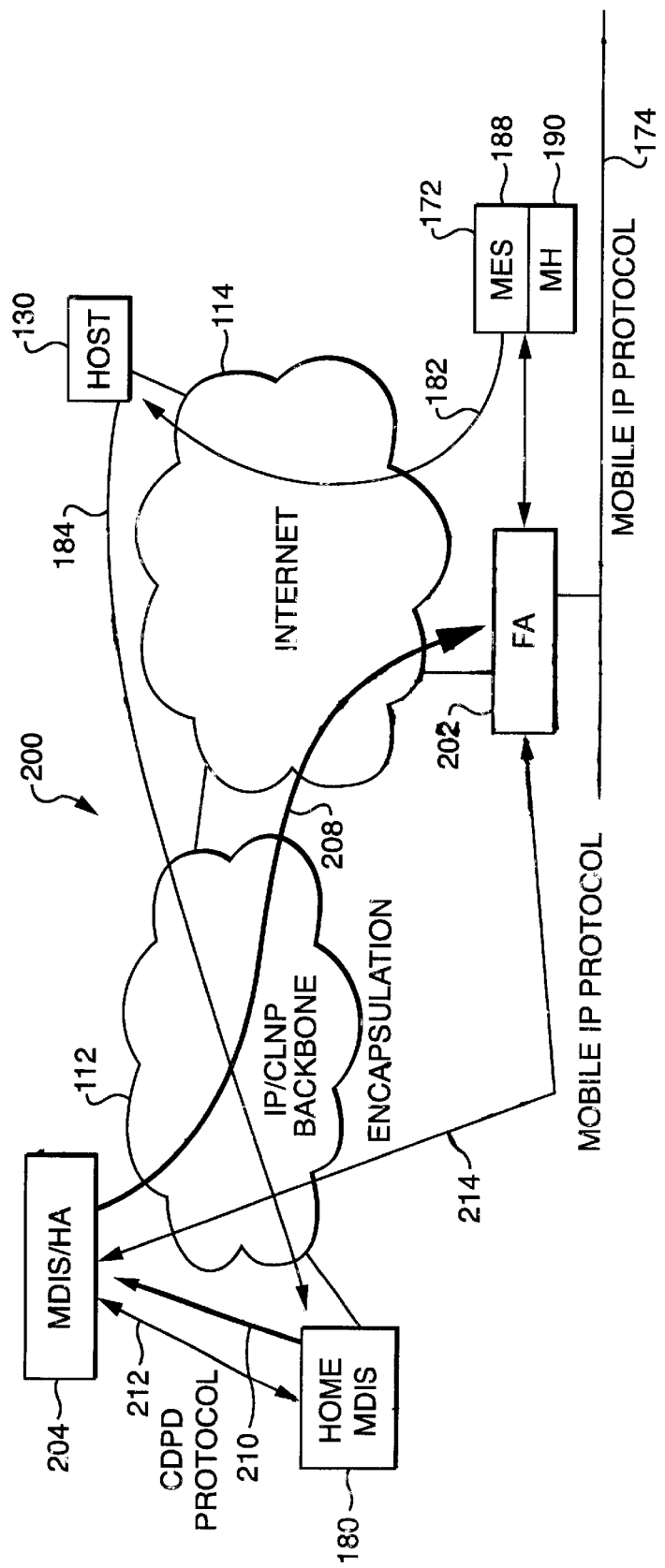
FIG. 12 depicts an alternative embodiment for allowing a CDPD device to negotiate data transfers across an Internet network and a CDPD compliant network.

FIGS. 11 and 12 depict a further embodiment of the invention that provides internetworking between a Mobile IP and a CDPD compliant network, to allow, inter alia, the mobile unit to migrate across a subnetworks of an Internet protocol network while allowing access to a service, or end station, connected to the CDPD network.

In particular, FIG. 11 depicts a system 170 that includes the CDPD network 112, an Internet protocol compliant network 114, the remote host 130, a mobile unit 172, an Internet subnetwork 174, a foreign agent 178, an MDIS 180, an MES 188, a Mobile IP Host 190, and a plurality of transmission paths 182, 184 and 186. The depicted CDPD network 112, the Internet network 114, and the remote IP host 130 can be similar to corresponding elements described above with reference FIGS. 7 and 8.

In FIG. 11, the mobile unit 172 is depicted as having migrated out of the CDPD network such that the mobile unit 172 cannot form a connection directly to the CDPD network 112 via MES Unit 188. Accordingly, FIG. 11 shows that with the internetworking system 170 of the invention, the mobile unit 172 can access the CDPD MDIS 180 by internetworking the Internet 114 with the CDPD network 112. The situation depicted in FIG. 11 can arise, for example, if the mobile unit 172 is a messaging unit that has migrated beyond the access of any cells of the CDPD network 112. Accordingly, to provide a messaging service to the MDIS 180, the mobile unit 172 can employ the Mobile IP network protocol to connect to the Internet 114 for accessing the MDIS 180.

To this end, the depicted mobile unit 172 can include a computer program for registering with the FA 178 of the subnetwork 174. The computer program can register the mobile unit 172 for internetworking the Internet 114 with the CDPD network 112. The computer program can access the MES 188 to collect therefrom the NEI of the MES element and can perform the Mobile IP registration request with the CDPD NEI as the address identifier. The development of such a computer program is within the skill of one of ordinary skill in the art of computer programming, and any computer program suitable for collecting the NEI address of the MES 188 and employing the NEI address during the Mobile IP registration request can be practiced with the invention without departing from the spirit thereof and will be straight-forward based on the description herein and on several well-known programming principles.

As depicted in FIG. 11, the FA element 178 is adapted for receiving the registration request from the mobile unit 172 and for monitoring the registration request to detect an IP compliant address that is indicative of a CDPD device. In one embodiment, the FA 178 includes a computer program that monitors registration requests to detect a registration request for a network address having a specified network address. The computer program operating on the FA 178, responsive to the detection of a select network address, can send a registration reply directly back to the mobile unit 172. Further, the computer program of the FA 178 can direct the FA 178 to employ, as described above, a registration protocol, such as the MNRP, to send a redirect request to the home MDIS of the MES 188 of the mobile unit 172, which is depicted in FIG. 11 as the MDIS 180.

As further shown in FIG. 11, IP packets originated from the mobile unit 172 can be directly delivered to their destinations, such as to the remote IP host element 130. For IP packets that are destined for delivery to the mobile unit 172, the MDIS 180 can include a computer program that encapsulates the packets and redirects them to the FA 178. In addition to the elements described above, the FA 178 can further include a decapsulation program that extracts from the encapsulated data packets the information destined for the mobile unit 172. The FA 178 can then deliver the information to the mobile unit 172 for completion of the transmission.

FIG. 12 depicts a further alternative embodiment of a system according to the invention for allowing a mobile data device to migrate across subnetworks of an Internet protocol network while having access to end systems of a CDPD network.

In particular, FIG. 12 depicts a system 200 that includes a CDPD network 112, an Internet network 114, a remote host 130, a mobile unit 172, an FA 202, an MDIS integrated with an HA 204, and transmissions paths 182, 184, 208, 210, 212 and 214. Again, as described above with reference to FIG. 11, those elements that are similarly labeled as elements in FIGS. 6 through 9, are similarly constructed and perform similar functions as to the elements of these Figures.

In the system 200, the underlying infrastructure of the Mobile IP network is left unchanged, and instead an MDIS Unit 204 is provided with a computer program that implements a home agent function, to program the MDIS Unit 204 to provide functionality of a combined MDIS/HA. In alternative embodiments of the invention, the HA Unit can be separate from the MDIS Unit. As depicted in FIG. 12, the HA Unit, whether integrated into the MDIS Unit or separate, is provided within the CDPD MES Unit 188 home network.

Messages destined for the mobile unit 172, such as messages transmitted by IP host 130, can be transferred via IP protocol to the home MDIS Unit 180. By employing the CDPD protocol link 212 between the MDIS/HA Unit 204 and the home MDIS 180, the MDIS/HA Unit can direct the home MDIS to transfer data packets to the MDIS/HA Unit 204 for subsequent delivery to the mobile unit 172. The home agent portion of the MDIS/HA Unit 204 can receive the data packets forwarded from the home MDIS 180 and transfer the data packets to the foreign agents 202 according to the Mobile IP. Alternatively, as also shown in FIG. 12, the MDIS Unit can intercept the packets destined to the mobile unit 172 and employ a Mobile IP encapsulation program to forward the data packets to the foreign agent 202. Accordingly, the foreign agent 202 can then pass the data packets to the mobile unit 172 for receipt by the MES Unit 188.

Figure 13:
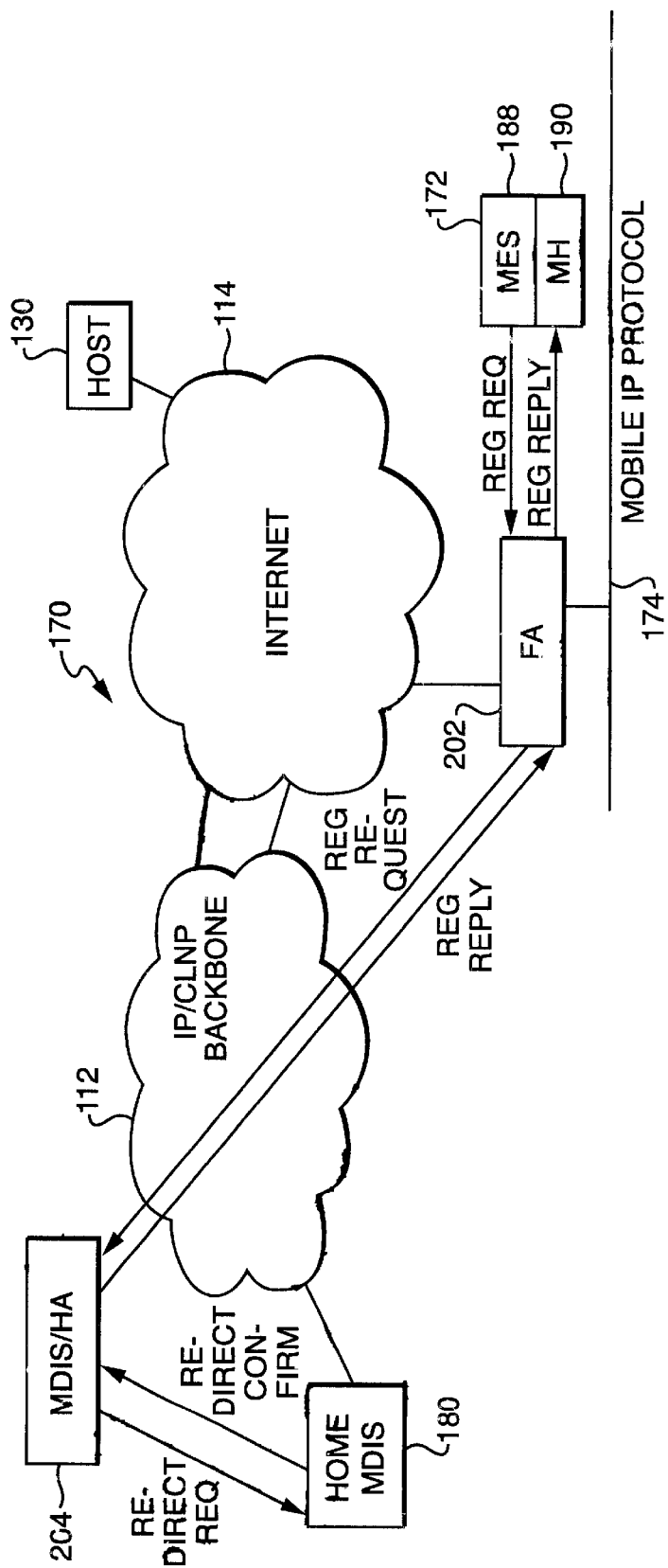
FIG. 13 depicts a registration process for a Mobile CDPD device migrating into a Mobile IP network.

FIG. 13 illustrates a process for allowing a mobile data device having a CDPD MES to migrate into a mobile IP network. The depicted mobile data device 172 integrates itself into both network systems through a registration process that negotiates a connection with each of the two network types. As shown in FIG. 13, the mobile host 190 sends a registration request to the FA 202. The FA 202 forwards the registration request to the MDIS/HA 204. Responsive to this, the MDIS/HA 204 can send a redirect request to the home MDIS 180. The home MDIS 180 confirms the redirection operation by sending a redirect confirmation signal to the MDIS/HA 204. The MDIS/HA 204 may send a registration reply back to the FA, and the FA can relay the registration reply back to the mobile host 172 of the mobile data device 172. This registration process allows for data to be redirected through the two networks, and allows the mobile data device 172 to connect to the IP network 114 and to employ services provided by the CDPD network. This is shown in FIG. 14.

Figure 14:
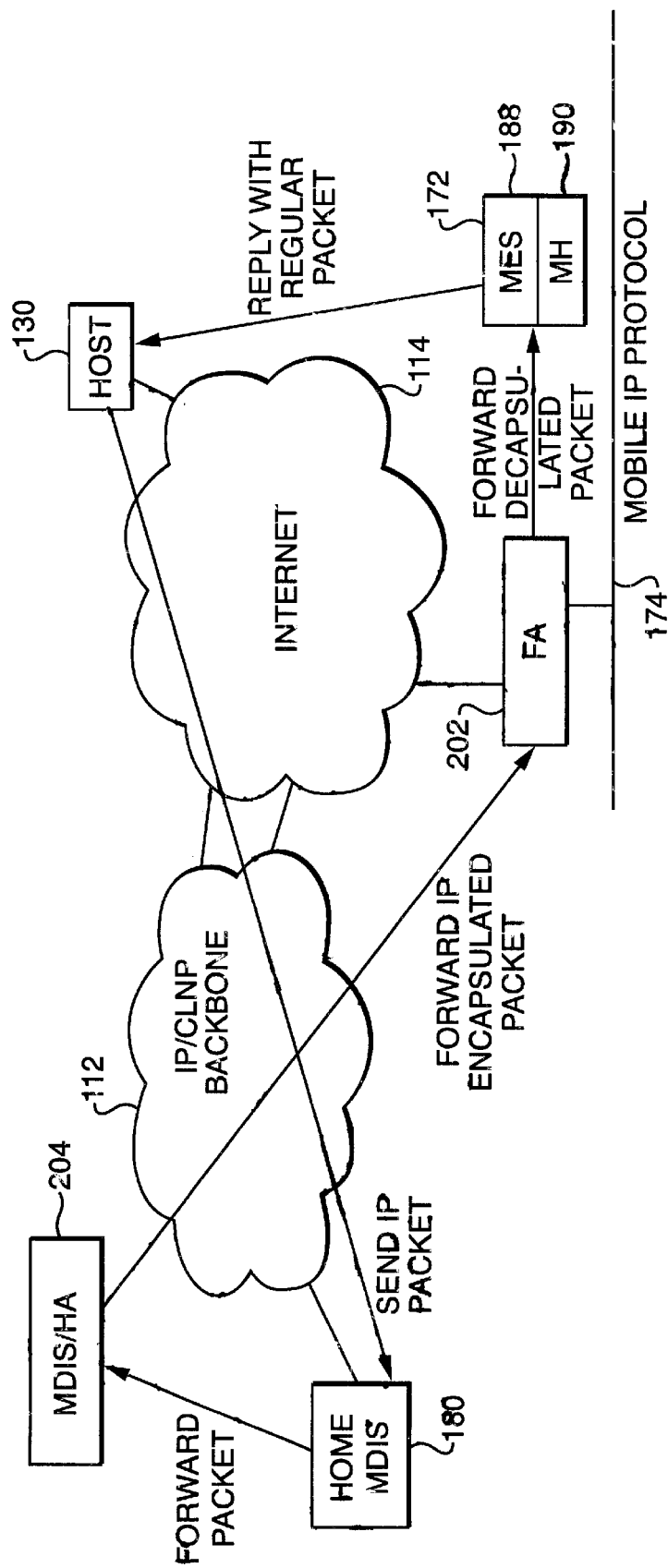
FIG. 14 depicts a process for performing internetwork data transfers for a Mobile CDPD data device operating in a Mobile IP network.

In particular, FIG. 14 illustrates a packet forwarding operation that may occur after the registration process depicted in FIG. 13. FIG. 14 shows that the host 130 can send an IP packet to the MES 180 using the regular IP protocol. The home MDIS 180 can forward the packet to the MDIS/HA 204 using CDPD encapsulation protocol. The MDIS/HA 204 employs an encapsulation program to encapsulate the data according to a mobile IP protocol, and forwards the encapsulated packet to the FA 202. The FA 202 employs a decapsulation packet to decapsulate the packet and sends the original packet to the mobile host 190 of the mobile data device 172. The mobile data device 172 can reply with regular IP packet delivery.

It will be apparent to one of ordinary skill in the art that substitutions, modifications and alterations can be made to the above described illustrated embodiments without departing from the scope of the invention. In particular, the illustrated embodiments have been described, in part, with reference to certain computer programs suitable for performing data processing for implementing the internetworking the systems of the invention. However, the computer programs can be replaced by hardware devices, or a combination of hardware and software devices, that can similarly implement the systems of the invention. Other modifications and substitutions can be made to the invention without departing from the scope thereof and the invention is not to be limited to the illustrated embodiments but is to be understood by the claims set forth herein. It further will be understood by the above detailed description, that the programs of the invention can operate on general purpose computer systems, to transform them into the systems of the invention. Accordingly, while the invention has been disclosed in connection with the certain embodiments shown and described in detail, various modifications and improvements thereto will be readily apparent to those of ordinary skill in the art. Accordingly, the spirit and scope of the present invention is to be limited only by the following claims.

What is claimed is:

1. A method for internetworking packet-switched networks that support mobility management functions, comprising:

routing packets to a mobile unit located in a first packet-switched network employing a first network protocol that supports mobility management functions; and routing packets between the first packet-switched network and a second packet-switched network when the mobile unit traverses to a location in the second packet-switched network, wherein the second packet-switched network employs a second network protocol that supports mobility management functions and wherein the second network protocol is different from the first network protocol.

2. The method of claim 1, wherein the first network protocol comprises a Mobile Internet Protocol (IP).

3. The method of claim 2, wherein the second network protocol comprises a Cellular Digital Packet Data (CDPD) protocol.

4. The method of claim 1, wherein the first packet-switched network comprises an Internet.

5. The method of claim 4, wherein the second packet-switched network comprises a Cellular Digital Packet Data (CDPD) network.

6. The method of claim 1, further comprising:

encapsulating the packets when routing the packets between the first packet-switched network and the second packet-switched network.

7. A method for internetworking packet-switched networks that support mobile data services, comprising:

routing packets from a mobile unit to a host, wherein the mobile unit is located in a first packet-switched network employing a first network protocol that supports mobile data services; and encapsulating and routing packets from the mobile unit to the host across a second packet-switched network and the first packet-switched network when the mobile unit traverse to a location in the second packet-switched network, wherein the second packet-switched network employs a second network protocol that supports mobile data services and wherein the second network protocol is different from the first network protocol.

8. The method of claim 7, wherein the first network protocol comprises a Mobile Internet Protocol (IP).

9. The method of claim 8, wherein the second network protocol comprises a Cellular Digital Packet Data (CDPD) protocol.

10. The method of claim 7, wherein the first packet-switched network comprises an Internet.

11. The method of claim 10, wherein the second packet-switched network comprises a Cellular Digital Packet (CDPD) network.

12. A system for internetworking packet-switched networks that support mobile data services, comprising:

a first mobility service controller configured to route packets to a mobile unit, wherein the first mobility service controller resides in a first packet-switched network that employs a first network protocol that supports mobility management functions;

a second mobility service controller configured to encapsulate and route packets to the first mobility service controller for delivery to the mobile unit, wherein the second mobility service controller resides in a second packet-switched network that employs a second network protocol that supports mobility management functions and wherein the second network protocol is different from the first network protocol.

13. The system of claim 12, wherein the first network protocol comprises a Mobile Internet Protocol (IP).

14. The system of claim 13, wherein the second network protocol comprises a Cellular Digital Packet Data (CDPD) protocol.

15. The system of claim 12, wherein the first packet-switched network comprises an Internet.

16. The system of claim 13, wherein the second packet-switched network comprises a Cellular Digital Packet Data (CDPD) network.

17. A mobility service controller, comprising:
a receiving unit configured to receive packets directed towards a mobile unit; and a processing unit configured to:
  route packets to the mobile unit when the mobile unit is located in a first packet-switched network that employs a first network protocol that supports mobile data services, and
  encapsulate packets for routing to another mobility service controller located in a second packet-switched network when the mobile unit transverse from the first packet-switched network to the second packet-switched network, wherein the second packet-switched network employs a second network protocol that supports mobile data services and wherein the second network protocol is different from the first network protocol.

18. The mobility service controller of claim 17, wherein the first network protocol comprises a Mobile Internet Protocol (IP).

19. The mobility service controller of claim 18, wherein the second network protocol comprises a Cellular Digital Packet Data (CDPD) protocol.

20. The mobility service controller of claim 17, wherein the first packet-switched network comprises an Internet.

21. The mobility service controller of claim 20, wherein the second packet-switched network comprises a Cellular Digital Packet Data (CDPD) network.

* * * * *